United States Patent Office 3,521,901
Patented July 28, 1970

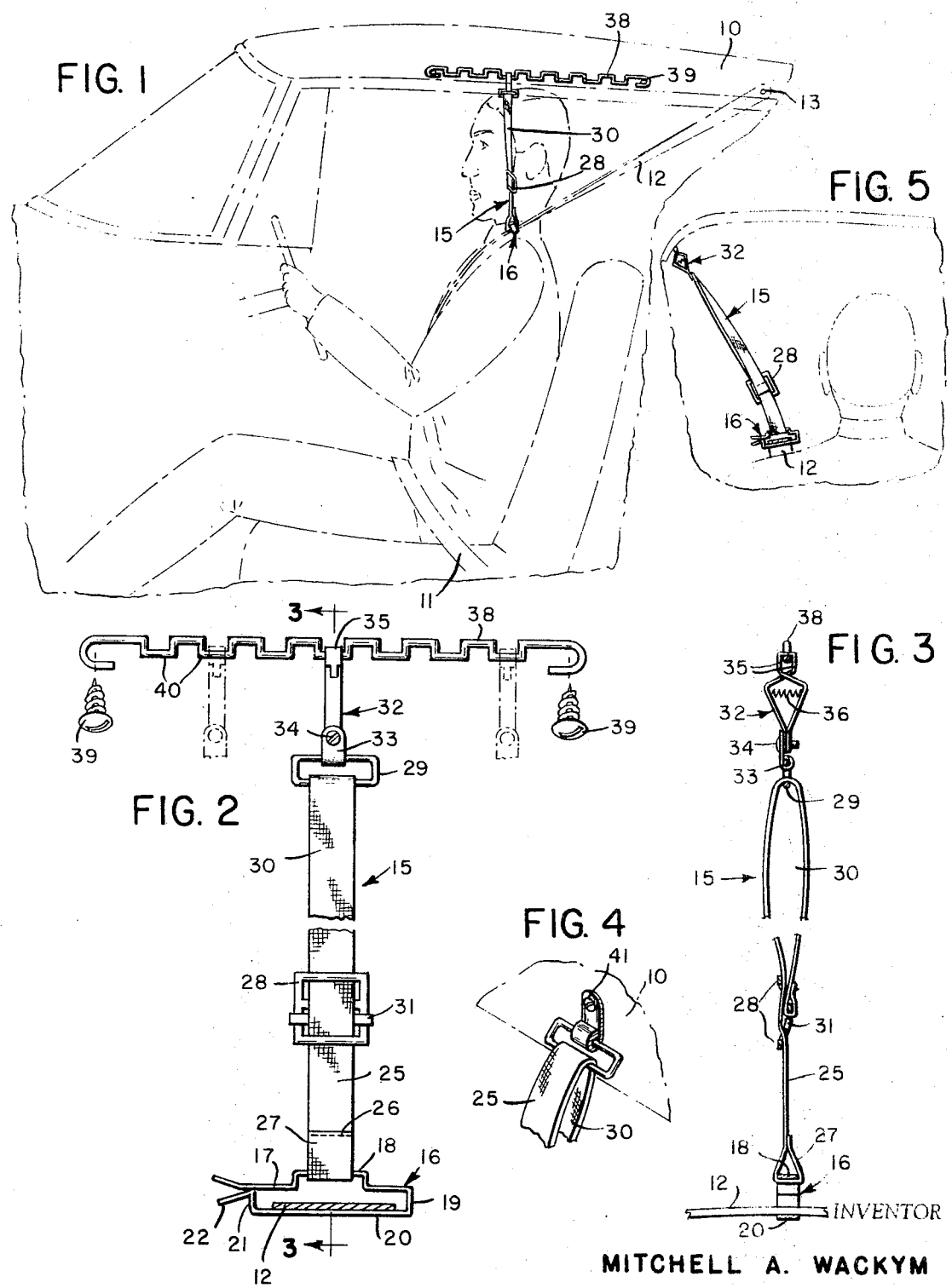
MITCHELL A. WACKYM

3,521,901
SHOULDER BELT COMFORT STRAP
Mitchell A. Wackym, 3037 Hillhedge Drive,
Montgomery, Ala. 36111
Filed Aug. 14, 1968, Ser. No. 752,570
Int. Cl. B60r 27/00
U.S. Cl. 280—150                                7 Claims

ABSTRACT OF THE DISCLOSURE

Apparatus for relieving the shoulder strap of an automotive vehicle to prevent rubbing and irritating the skin of the user of the shoulder belt safety strap.

BACKGROUND OF THE INVENTION

Field of the invention

This invention relates generally to accessories for automobiles and relates particularly to shoulder straps or other safety harness and to apparatus for making the straps more comfortable and thereby encourage the use of the same so that the full safety capabilities of the strap will be utilized.

Description of the prior art

In recent years, many steps have been taken by both private industry and the Government to increase the safety of automobile operators and passengers. A major step was the provision of seat belts within the automobile and a public safety program to educate and encourage the general public to use the seat belts. Continued study of the problem, including the effects on operators and passengers in both actual and simulated accidents, convinced the automobile manufacturers, as well as the Government agencies involved, that shoulder straps are more effective than seat belts and should be used in place of or in conjunction with the same. The shoulder strap, while being more effective in the event of an accident, has not been comfortable to wear primarily because it is attached to the structure of the automobile at a point behind and to one side of the wearer and has extended from the seat upwardly and rearwardly over the upper portion of the body of the wearer to the point of attachment to the automobile frame. In this position the shoulder strap is non-yielding, while the upper portion of the body of the wearer is substantially constantly in motion due to the unevenness of the surface over which the vehicle is travelling, as well as the unconscious balancing of the upper portion of the body when the vehicle is maneuvered. The constant movement of the body against the fixed strap has resulted in a frictional rubbing of the skin of the user which has been uncomfortable and in many cases has resulted in the non-use of the safety device.

SUMMARY OF THE INVENTION

The present invention is a shoulder belt comfort strap having one end engaging and supporting a portion of the shoulder belt and the opposite end connected either permanently or adjustably to the fixed structure of the automobile and in such a position that the end engaging the safety belt will maintain the belt in spaced relation to the body of the user and thereby substantially reduce the frictional contact therewith. The comfort strap is adjustable to accommodate persons of various sizes as well as to accommodate different positions of the user.

BRIEF DESCRIPTION OF THE DRAWING

FIG. 1 is a perspective illustrating one application of the invention;

FIG. 2 is a plan view;

FIG. 3 is a section on the line 3—3 of FIG. 2; and

FIG. 4 is a fragmentary perspective of a modified form of strap connecting means; and FIG. 5 is a schematic illustrating the manner of connection of the strap to the vehicle, showing the device in use.

DESCRIPTION OF THE PREFERRED EMBODIMENTS

With continued reference to the drawing, an automobile or other vehicle 10 may be provided with a safety seat belt 11 and a safety shoulder belt 12 for holding the operator of the vehicle or a passenger in position in the event of an accident. The seat belts 11 and one end of the shoulder belt 12 normally are secured at one end of the floor or chassis of the vehicle and the opposite end of the shoulder belt is fastened to the upper frame of the vehicle by a fastener 13. The belts 11 and 12 are conventional safety precautions and form no part of the invention.

The shoulder belt 12 has had a tendency to cause a tender place on the shoulder of the user due to friction and as a result, the shoulder strap has frequently been left off. In order to prevent friction between the shoulder and as a result, the shoudler strap has frequently been belt 12 and the skin of a user, the present invention includes a strap assembly 15 having a shoulder belt engaging clip 16 at one end and means for mounting the strap assembly to the frame of the vehicle at the other end. The clip 16 includes a strip of spring metal or other resilient material having an upper portion 17 with a raised offset strap-receiving portion 18 substantially midway of its length. The upper portion terminates in a downwardly extending end portion 19 connected to a lower portion 20 generally parallel to the upper portion 17. The end of the lower portion 20 opposite the end 19 is bent upwardly as at 21 and then outwardly and downwardly as at 22 with the bend therebetween being located adjacent to or in engagement with the lower surface of the upper portion 17. This structure is in the shape of a hollow, generally rectangular box with a mouth at one corner to facilitate insertion and removal of the shoulder belt 12.

The strap assembly 15 includes a strap 25 having one end passing around the offset portion 18 of the clip and then secured to itself as by threads or other fasteners 26 to form a loop 27. As illustrated in FIGS. 2 and 3, the strap 25 extends upwardly from the clip 16 through a buckle 28, after which it passes through a fastening ring 29 and then is bent back on itself forming a loop 30 in which the fastening ring is freely movable. The end of the strap 25 extends around the central portion of the buckle 28, after which it is sewn or otherwise attached to itself to secure the buckle to the end of the strap. With this construction, the overall length of the strap 25 is easily adjustable by moving the buckle 28 along the strap 25 to increase or decrease the size of the loop 30. The buckle 28 preferably has a slidable toothed locking bar 31 which can be moved into selective engagement with the strap 25 to lock the strap and buckle in fixed adjusted position.

In the preferred form of the invention, a connector 32 is secured to the fastening ring 29 in any desired manner as by a link or loop 33 carried by the ring 29 and attached to the end of the connector 32 in any desired manner as by a fastener 34. As illustrated, the connector is an alligator clip type although any other disengageable clip or hook-type connector could be used. The connector 32 has a pair of opposed jaws 35 urged toward each other by a spring member 36 and such jaws can be opened or released by squeezing the sides of the connector against the tension of the spring member 36.

In order to support the strip assembly 15, an elongated connector bar 38 is mounted on the frame of the vehicle 10 by self-tapping screws or other fasteners 39 at opposite ends of such bar, although, if desired, one end of the bar can be connected to the frame by the fastener 13 which connects the shoulder belt 12. The connector bar 38 has a plurality of areas or portions 40 disposed in a position to be selectively engaged by the jaws 35 of the connector 32. As illustrated in FIG. 2, the connector bar 38 is constructed of relatively stiff spring wire, or other resilient material, which will flex under strong pressure to permit the shoulder belt 12 to perform the function for which it was intended without interference from the strap of the present invention.

Instead of the spring wire connector bar 38, it is contemplated that the connector bar could be made of a relatively rigid strip of material having a plurality of openings for receiving the jaws of the connector 32.

With reference to FIG. 4, a modified from of connection to the frame of the vehicle is illustrated in which the link or loop 33 is connected in fixed position to the frame of the vehicle by a self-tapping screw or other fastener 41. In this modification, the strap assembly can be mounted in any desired position, but is not adjustable after it is mounted.

In the operation of the device, the operator or passenger of the vehicle applies the shoulder belt 12 to himself and then slips the belt into the clip 16. The connector 32 then is attached to the desired position of the connector bar 38 and thereafter the strap 25 is adjusted relative to the buckle 28 until the strap assembly is tight and the pressure caused by the shoulder belt is relieved.

What is claimed is:

1. In an automobile having roof structure, at least one seat, and a shoulder safety belt with one end of the belt mounted on the upper frame of the automobile and rearwardly of the seat, that improvement comprising means to relieve the pressure of the shoulder belt on the shoulder of the user, said means including strap means, a first connecting means for releasably connecting one end of said strap means to said shoulder belt, support means mounted on the roof structure of the automobile, and second connecting means for connecting the other end of said strap means to said support means forwardly of said safety belt mounting so that the shoulder belt normally is spaced from the shoulder of the user.

2. The structure of claim 1 in which said first connecting means includes resilient clip means which permits free movement of said belt therethrough.

3. The structure of claim 1 in which said support means includes an elongated connector bar, means for mounting said bar on the roof structure of said automobile, and said connector bar having multiple receiving areas for said connecting means.

4. The structure of claim 1 in which said strap means is adjustable.

5. The structure of claim 1 in which said strap means is of elastic material.

6. The structure of claim 3 in which said connector bar is constructed of resilient material.

7. Apparatus for providing safety and comfort to the occupants of an automobile having a roof structure and at least one seat, said apparatus comprising a safety belt adapted to extend across the body and over the shoulder of the occupant, means for mounting one end of said belt on said roof structure rearwardly of said seat, a strap located adjacent to and above the shoulder of the occupant, clip means attached to one end of said strap for releasably engaging said belt, support means mounted on the roof structure of the automobile, and connecting means for connecting the opposite end of said strap to said support means forwardly of said belt mounting means so that the strap means relieves the pressure of the safety belt on the shoulder of the occupant.

References Cited

UNITED STATES PATENTS

| 211,479 | 1/1879 | Shelby | 24—73 |
| 1,454,213 | 5/1923 | Chapman et al. | |
| 1,718,524 | 6/1929 | Carlson et al. | 24—259.1 |
| 1,779,442 | 10/1930 | Mueller. | |
| 3,236,540 | 2/1966 | Berton et al. | 280—150 |

LEO FRIAGLIA, Primary Examiner

R. R. SONG, Assistant Examiner

U. S. Cl. X.R.

24—259